(12) United States Patent
Pascal et al.

(10) Patent No.: US 7,870,211 B2
(45) Date of Patent: Jan. 11, 2011

(54) CONVERSATION MESSAGE ROUTING SUPPORTING DYNAMIC CLASS TRANSITIONS

(75) Inventors: Kristin Marie Pascal, Bothell, WA (US); Andrew Klonsky, Portland, OR (US); Matthew Bailey, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 196 days.

(21) Appl. No.: 12/343,354

(22) Filed: Dec. 23, 2008

(65) Prior Publication Data

US 2010/0161738 A1 Jun. 24, 2010

(51) Int. Cl.
*G06F 15/16* (2006.01)
(52) U.S. Cl. .................. 709/206; 709/205; 709/207
(58) Field of Classification Search ............. 709/205, 709/206, 207, 204
See application file for complete search history.

(56) References Cited

U.S. PATENT DOCUMENTS

| | | | |
|---|---|---|---|
| 5,880,731 A | 3/1999 | Liles | |
| 5,894,305 A | 4/1999 | Needham | |
| 6,177,931 B1 | 1/2001 | Alexander | |
| 6,434,604 B1 | 8/2002 | Harada | |
| 7,086,005 B1 | 8/2006 | Matsuda | |
| 7,124,164 B1 | 10/2006 | Chemtob | |
| 7,218,943 B2 | 5/2007 | Klassen | |
| 7,343,561 B1 | 3/2008 | Stochosky et al. | |
| 7,386,799 B1 | 6/2008 | Clanton | |
| 7,392,288 B2 | 6/2008 | Ooi et al. | |
| 7,421,690 B2 | 9/2008 | Forstall | |
| 7,480,724 B2 * | 1/2009 | Zimler et al. ............... 709/229 |
| 7,512,651 B2 * | 3/2009 | Offermann .................. 709/203 |
| 2003/0154249 A1 * | 8/2003 | Crockett et al. ............. 709/204 |
| 2003/0228909 A1 | 12/2003 | Tanaka | |
| 2004/0260756 A1 | 12/2004 | Forstall | |
| 2005/0004985 A1 | 1/2005 | Stochosky | |
| 2005/0004995 A1 | 1/2005 | Stochosky | |
| 2006/0173961 A1 * | 8/2006 | Turski et al. ................ 709/206 |
| 2006/0248149 A1 * | 11/2006 | Kraft et al. .................. 709/206 |
| 2006/0277271 A1 | 12/2006 | Morse | |
| 2007/0152979 A1 | 7/2007 | Jobs | |
| 2007/0156910 A1 | 7/2007 | Christie | |
| 2007/0174399 A1 * | 7/2007 | Ogle et al. .................. 709/206 |
| 2008/0034037 A1 | 2/2008 | Ciudad | |

(Continued)

FOREIGN PATENT DOCUMENTS

WO WO2005067327 A1 7/2005

OTHER PUBLICATIONS http://www.slashphone.com/xumii-launches-first-social-address-book-for-mobile-phones-at-demofall-08-212021, Retrieved Feb. 20, 2009.

(Continued)

*Primary Examiner*—Michael Won

(57) ABSTRACT

The claimed subject matter provides for systems, devices, and methods for dynamic transitioning between messaging conversation classes including 1:1, 1:Many, and Many:Many (N:M) conversation protocols. These messaging topologies can be transitioned based at least in part on the number of conversants, a predetermined threshold value, and both determinations and inference related to the conversation topology, message, and conversants. The claimed subject matter can provide for effective seamless messaging conversations in unified messaging environment by reducing the overhead associated with changing numbers of conversants.

17 Claims, 10 Drawing Sheets

U.S. PATENT DOCUMENTS

| | | | |
|---|---|---|---|
| 2008/0034038 A1 | 2/2008 | Ciudad | |
| 2008/0034315 A1 | 2/2008 | Langoulant | |
| 2008/0055269 A1 | 3/2008 | Lemay | |
| 2008/0094368 A1 | 4/2008 | Ording | |
| 2008/0094369 A1 | 4/2008 | Ganatra | |
| 2008/0165148 A1 | 7/2008 | Williamson | |
| 2009/0150488 A1* | 6/2009 | Martin-Cocher et al. | 709/204 |
| 2010/0011072 A1* | 1/2010 | Mishchenko | 709/206 |
| 2010/0057754 A1* | 3/2010 | Moudy et al. | 709/206 |

OTHER PUBLICATIONS http://www.xumii.com/ Retrieved Feb. 20, 2009.
http://www.apple.com/macosx/features/ichat.html Retrieved Feb. 20, 2009.
http://www.apple.com/macosx/features/300.html#ichat Retrieved Feb. 20, 2009.
http://www.flickr.com/photos/rmohns/1752400601/ Retrieved Feb. 20, 2009.
http://en.wikipedia.org/wiki/Ichat Retrieved Feb. 20, 2009.
http://www.techcrunch.com/2007/08/15/most-useful-iphone-site-yet-meebo/ Retrieved Feb. 20, 2009.
http://www.appsafari.com/utilities/837/beejive-im/ Retrieved Feb. 20, 2009.
http://www.boygeniusreport.com/gallery/handsets/beejive-for-iphone/ Retrieved Feb. 20, 2009.
http://www.boygeniusreport.com/gallery/handsets/beejive-for-iphone/?pid=3076#picture_nav Retrieved Feb. 20, 2009.
http://www.ilounge.com/index.php/articles/comments/iphone-gems-the-best-instant-messaging-apps Retrieved Feb. 20, 2009.
http://www.iphonehacks.com/2007/08/iphone-mundu-im.html Retrieved Feb. 20, 2009.
http://www.iphonehacks.com/2007/07/iphone-trillian.html Retrieved Feb. 20, 2009.
http://www.group2call.com/ Retrieved Feb. 20, 2009.
http://www.appsafari.com/chat/1452/group2call Retrieved Feb. 20, 2009.
http://www.swaggle.mobi/sessions/new Retrieved Feb. 20, 2009.
http://twitter.com/ Retrieved Feb. 20, 2009.
http://www.sweetim.com/ Retrieved Feb. 20, 2009.
http://www.techcrunch.com/2006/09/27/a-look-at-eight-multi-person-sms-services/ Retrieved Feb. 20, 2009.
http://www.labnol.org/internet/google-sms-subscribe-rss-via-sms/4726/ Retrieved Feb. 20, 2009.
http://www.txtblaster.com/ Retrieved Feb. 20, 2009.
http://www.eztexting.com/ Retrieved Feb. 20, 2009.
http://in.content.mobile.yahoo.com/new/groups/tour3.html Retrieved Feb. 20, 2009.
http://www.sendgroupsms.com/ Retrieved Feb. 20, 2009.
http://www.jabber.org.au/ichat Retrieved Feb. 20, 2009.
http://www.mac.com/1/images/ichat_screeshot1_20051012.jpg Retrieved Feb. 20, 2009.
http://www.textually.org/textually/archives/2007/12/018249.htm Retrieved Feb. 20, 2009.
http://www.macupdate.com/info.php/id/24959 Retrieved Feb. 20, 2009.
http://news.cnet.com/8301-13579_3-9962739-37.html Retrieved Feb. 20, 2009.
http://modmyi.com/forums/new-skins-themes-launches/4610-sms-balloon-collection.html Retrieved Feb. 20, 2009.
http://farm2.static.flickr.com/1321/1352786329_808877273e_o.png Retrieved Feb. 20, 2009.
http://mooseyard.com/Jens/wp-content/uploads/2008/03/balloon-chat-ui-21-april-1997.png Retrieved Feb. 20, 2009.
http://www.dbug.org/publications/articles/ichat_1_review.shtml Retrieved Feb. 20, 2009.
http://iphone.cazisoft.com/?paged=11 Retrieved Feb. 20, 2009.
http://www.mysupergroups.com/tour Retrieved Feb. 20, 2009.
http://www.mysupergroups.com/faqs Retrieved Feb. 20, 2009.
http://www.cssplay.co.uk/menu/bubbles Retrieved Feb. 20, 2009.
http://www.testiphone.com/. Retrieved on Feb. 20, 2009. Cumulative citation, no copy attached per 37 C.F.R. 1.98 (c).
http://www.tatango.com/tatango/details. Retrieved on Feb. 20, 2009.
http://www.smsgupshup.com/help. Retrieved on Feb. 20, 2009.
http://www.intomobile.com/2007/12/07/change-your-iphones-sms-text-message-bubbles-to-a-matte-finish-iphone-matte.html. Retrieved on Feb. 20, 2009. Cumulative citation, no copy attached per 37 C.F.R. 1.98(c).
http://www.youtube.com/watch?v=VDnzgvRh6Xk. Retrieved on Feb. 20, 2009. Cumulative citation, no copy attached per 37 C.F.R. 1.98(c).
http://www.eztext.com/. Retrieved on Feb. 20, 2009. Cumulative citation, no copy attached per 37 C.F.R. 1.98(c).
http://www.faculty.idc.ac.il/arik/IMRet-All.mov. Retrieved on Feb. 20, 2009. Cumulative citation, no copy attached per 37 C.F.R. 1.98(c).
http://www.iminent.com/default.aspx. Retrieved on Feb. 20, 2009. Cumulative citation, no copy attached per 37 C.F.R. 1.98(c).
http://www.youtube.com/watch?v=rliqNvybcR4. Retrieved on Feb. 20, 2009. Cumulative citation, no copy attached per 37 C.F.R. 1.98(c).
http://www.openwave.com/us/news_room/press_releases/2002/20020319_opwv_mmsandsms_0319.htm. Retrieved Feb. 20, 2009.
www.3jam.com. Retrieved Feb. 20, 2009.
http://mashable.com/2007/09/20/virgin-mobile-3jam/. Retrieved Feb. 20, 2009.
http://news.cnet.com/8301-13580_3-9768707-39.html. Retrieved Feb. 20, 2009.
http://ajaxpatterns.org/Predictive_Fetch. Retrieved Feb. 20, 2009.
http://help.yahoo.com/tutorials/cg/mail/cg_chatadv2.html. Retrieved Feb. 20, 2009.
http://www.talkshoe.com/se/about/TSAbout.html. Retrieved Feb. 20, 2009.
http://en.wikipedia.org/wiki/Second_Life. Retrieved Feb. 20, 2009.
http://www.whyville.net/smmk/nice. Retrieved Feb. 20, 2009.
http://www.there.com/whatIsThere.html. Retrieved Feb. 20, 2009.
http://slfix.com/?p=658. Retrieved Feb. 20, 2009.
http://extratorrent.com/torrent/905198/Text+Message+to+TV+Screen+by+FireText.html. Retrieved Feb. 20, 2009.
http://mooseyard.com/Jens/2005/06/little-boxes-of-words/. Retrieved Feb. 20, 2009.

* cited by examiner ns for participating in messaging service protocols such as text messaging by short messaging service (SMS), multimedia messaging service (MMS) instant messaging (IM) applications, IP messaging, email, and the like. Typically, each of these protocols remains a separate and distinct application on a user equipment. Further, many of these protocols employ communications hardware backbones that are distinct and not supportive of cross protocol interactions. As a result, many communications on modern user equipment, commonly referred to as "texting" (which includes SMS, MMS, IM, IP messaging, email, voice snippets, emoticons, visual messaging, and many others), employ multiple protocols, numerous inboxes, outboxes, and commonly third party software applications to facilitate some approximation of simplifying and unifying the numerous communication avenues.

CONVERSATION MESSAGE ROUTING SUPPORTING DYNAMIC CLASS TRANSITIONS

BACKGROUND

Modern communication devices typically have mechanisms for participating in messaging service protocols such as text messaging by short messaging service (SMS), multimedia messaging service (MMS) instant messaging (IM) applications, IP messaging, email, and the like. Typically, each of these protocols remains a separate and distinct application on a user equipment. Further, many of these protocols employ communications hardware backbones that are distinct and not supportive of cross protocol interactions. As a result, many communications on modern user equipment, commonly referred to as "texting" (which includes SMS, MMS, IM, IP messaging, email, voice snippets, emoticons, visual messaging, and many others), employ multiple protocols, numerous inboxes, outboxes, and commonly third party software applications to facilitate some approximation of simplifying and unifying the numerous communication avenues.

The negative impact of overlapping and cumbersome "texting" platforms (e.g., any combination of the numerous forms of text/video/voice communications other than a traditional voice phone call) on mobile devices has not gone without notice by device manufacturers, service providers, and third party application developers. Third party developers often are the most nimble and quickest to respond with attempts at fulfilling a long-felt need such as a unified messaging platform to support "texting". However, many of these third party developers have lacked access to aspects of the hardware and core software of the myriad devices, systems, and protocols for texting. As a result, many third party applications are not robust enough, broad enough, or implemented in an attractive manner and fail to fulfill the long felt needs of the masses.

Device manufacturers and service providers generally are not as nimble as smaller third party application developers and are more constrained in business decision making, and thus rarely rush to put out product that is friendly to a competitor's product, service, or protocol. As a result, solutions for consumers' long felt needs may go unfulfilled by device manufacturers and service providers despite these entities having better access to the subsystems and core engineering that would enable them to develop a more ideal system/device in a less competitive environment.

As mobile device technologies become more ubiquitous and begin merging with more traditional computer manufacture and development, products and services are appearing for mobile devices that blur the lines between mobile and traditional notions of non-mobile devices. Interestingly, many business practices have also adapted to the coalescing mobile computing environment. One result of this is more interaction between device manufacturers and service providers in development and standards-setting environments. This is also true across competing platforms where the realization is that consumers will tend to gravitate to a less limiting service or device provider where possible and feasible. Thus, to keep customers, making devices and services more competitor-friendly has become almost a survival requirement.

The resulting more cooperative development environment is yielding improved services and devices for customers. One area of improvement that will be of great benefit to mobile device users is the move toward unification of messaging systems. There is clearly a desire and long-felt need to simplify and effectively coalesce the plurality of overlapping "texting" communications systems. This is also especially true in cross platform and cross provider conditions. Further, support of legacy devices will be well received by consumers.

One problematic aspect of traditional messaging environments is managing, in a clear and effective manner, messaged communications in a 'conversation' having a dynamic number of participants. Even where sometime in the future there may arise some form a unified communications platform, many messaging features would continue to remain dependent upon the number of participating conversants in that hypothetical unified messaging environment. This is especially true under the constraints of limited display area on many modern mobile devices.

Traditional attempts at reducing confusion due to the number of conversants in non-unified messaging environments have included limiting conversants to fewer than a set number (e.g., messages could be sent to 5 or fewer conversants only), forcing separate messaging systems for different numerical conversant classes (e.g., a message thread for a one to one (1:1) conversation is separate from a thread for a many to many (N:M) conversation or a one to many (1:M) conversation), or other limiting techniques. Arguably these techniques, especially where applied to mobile devices, can limit the efficacy of messaging as a communications tool in many situations. For instance, having 5 conversants and wanting to add a $6^{th}$ can be prohibited in conventional systems. Similarly, having a messaging conversation including 1:1 conversations and N:M conversations seamlessly threaded can also be impossible to achieve under traditional messaging systems. Clearly there is still much room for improvement in managing features across shifting numbers of conversants in messaging and threaded messaging conversations.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The claimed subject matter provides for managing messaging systems in relation to several conversant quanta as related to conversation classes as are defined in more detail herein. Further, managing messaging systems for dynamic changes in conversant quanta or conversation classes is disclosed. As used herein, a messaging environment can include "texting" messages (e.g., short messaging service (SMS) messages, multimedia messaging system (MMS) messages, instant messaging (IM) type messages, IP messages, email messages, video snippets, voice snippets, web snippets, twitters, emoticons, etc.), more especially in a mobile device environment. A threaded messaging environment can include a messaging environment that supports threading messages, for example, threading messages by time. While the list of particular communications protocols is non-exhaustive, it is intended to convey that "texting" incorporates messages of conversational length, including referenced media type objects, exclusive of pure traditional voice conversation, such as in a telephone call (e.g., a traditional telephone call is not "texting," but a SMS thread that includes MMS or voice snippets can be considered "texting").

In an aspect a 1:1 conversation includes messaging between two conversant entities, typically two users each with a messaging device. This generally represents a person-to-person messaging set which can be threaded or not threaded. The 1:1; conversation can be considered one "class" of conversation to distinguish it from other classes that can have different numbers of conversants and/or different conversation topologies. Similarly, the 1:1 conversation can be considered to correlate with a particular "conversant quantum" so as to be contrasted to other conversant quanta correlating with different numbers of conversants and/or different conversation topologies. An exemplary topology for a 1:1 conversation is illustrated at 500 of FIG. 5.

In another aspect a 1:M conversation includes messaging between a first conversant entity and other conversant entities (generally two or more other conversant entities). This can be a first user with a messaging device communicating exclusively to a group of other conversants each with a messaging device. Typically, in a 1:M conversation, messages from the first user will go to all members of the messaged group of users (1→M) and messages from any of the members of the group will only be sent to the first user (M→1) (e.g., other group members will typically not receive the message from group member conversants to the first conversant). This generally represents a broadcast message or blast messaging set which can be threaded or not threaded. The 1:M; conversation can be considered one "class" of conversation to distinguish it from other classes that can have different numbers of conversants and/or different conversation topologies. Similarly, the 1:M conversation can be considered to correlate with a particular "conversant quantum" so as to be contrasted to other conversant quanta correlating with different numbers of conversants and/or different conversation topologies. An exemplary topology for a 1:M conversation is illustrated at 508 of FIG. 5.

In a further aspect a N:M conversation includes messaging among a plurality of conversant entities (typically exceeding two conversants to distinguish N:M from 1:1 conversations). Generally, a plurality of users, each with a messaging device, share messages with at least a subset of other users. This generally represents a group messaging set which can be threaded or not threaded. For example, in a N:M conversation, messages from a first user will go to all members of the group conversation (N→M) and messages from any of the other members of the group will be sent all of the other members of the group (M→N) (e.g., this is analogous to conversation in a meeting hall where everyone experiences the conversations of everyone else). The N:M conversations can rapidly overwhelm users due to the massive numbers of messages that can occur when "everyone is talking at the same time", and such classes of conversation can be capped at a predetermined number of conversants. The N:M conversation can be considered one "class" of conversation to distinguish it from other classes that can have different numbers of conversants and/or different conversation topologies. Similarly, the N:M conversation can be considered to represent a particular "conversant quantum" so as to be contrasted to other conversant quanta correlating with different numbers of conversants and/or different conversation topologies. An exemplary topology for an N:M conversation is illustrated at 518 of FIG. 5.

In accord with an aspect of the claimed subject matter, a messaging environment or threaded messaging environment system employing conversation message routing can support 1:1 conversations (e.g., messaging between two single conversants), 1:M conversations (e.g., messaging between a single conversant and a plurality of conversants, also called a blast message, a broadcast message, etc.), and/or N:M conversations (e.g., messaging among a plurality of conversants, also called a group conversation, etc.). In accordance with another aspect of the disclosed subject matter, conversation message routing supports dynamic transitions among 1:1, N;M, and 1:M conversations. In a further aspect, support of and/or transition between 1:1, N;M, and/or 1:M conversations is enabled for legacy devices, between legacy devices and enabled devices, or between enabled devices only employing conversation message routing.

Certain illustrative aspects of the disclosed innovation are described herein in connection with the following description and the annexed drawings. These aspects are indicative, however, of but a few of the various ways in which the principles disclosed herein can be employed.

DETAILED DESCRIPTION

Figure 1:
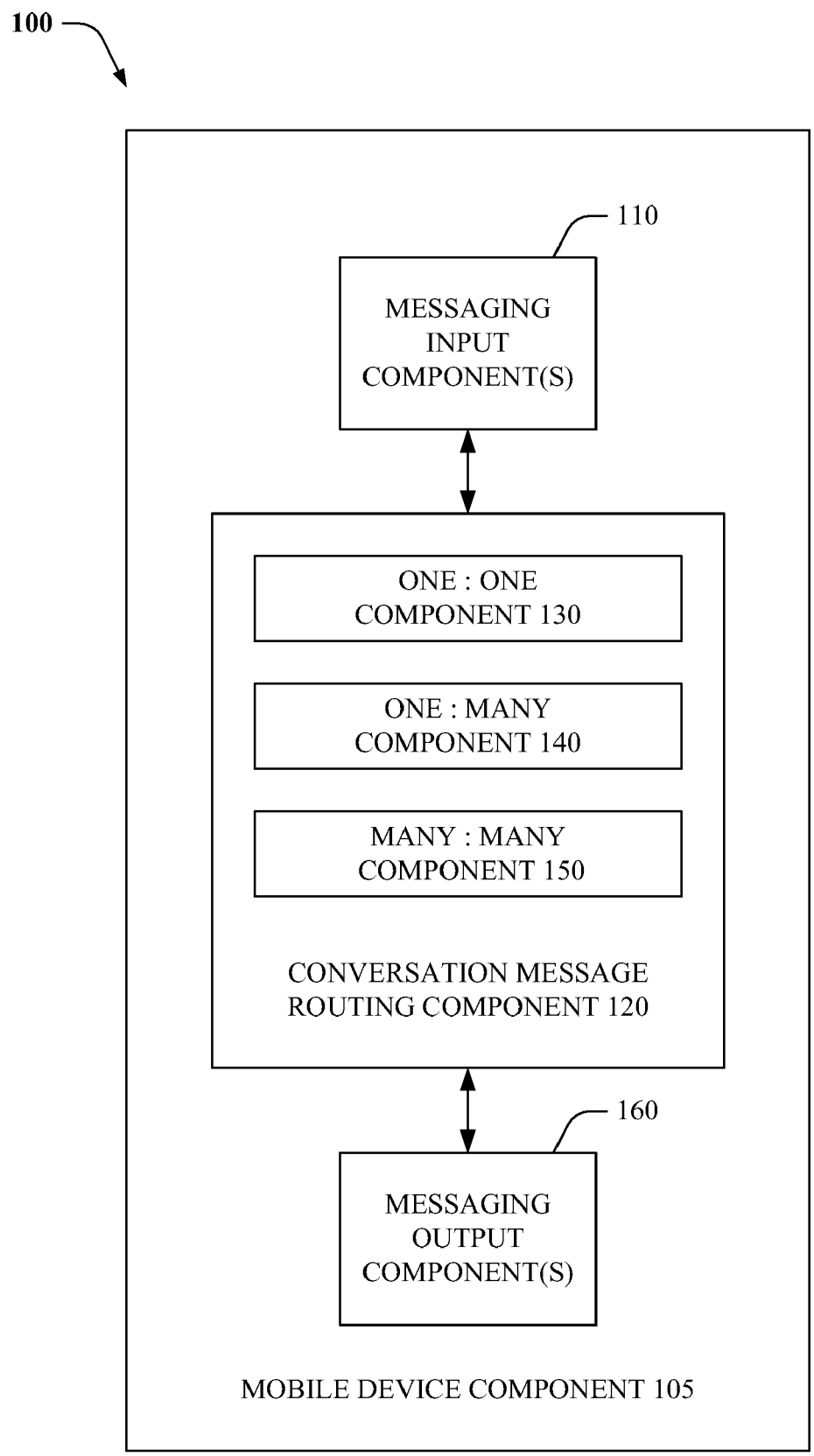
FIG. 1 illustrates an exemplary system that facilitates conversation message routing for messaging environments in accord with aspects of the claimed subject matter.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component.

One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It will be appreciated by one of skill in the art that a communication network for systems described herein can include any suitable mobile and/or landline based circuit-switched communication network including a GSM network, a time division multiple access (TDMA) network, a CDMA network, such as IS-95 and subsequent iterations of CDMA technology, an integrated digital enhanced network (iDEN) network and a public switched transport network (PSTN). Further examples of a communication network can include any suitable data packet-switched or combination data packet/circuit-switched communication network, e.g., a wired or wireless internet protocol (IP) network such as a voice over internet protocol (VoIP) network, an IP data network, a universal mobile telecommunication system (UMTS) network, a general packet radio service (GPRS) network, and other communication networks that provide streaming data communication over IP and/or simultaneous voice and data communication over combination data packet/circuit-switched technologies.

Similarly, one of skill in the art will appreciate that a communication device for systems disclosed herein can include a mobile device, mobile phone, a PSTN phone, a cellular communication device, a cellular phone, a satellite communication device, a satellite phone, a VoIP phone, a WiFi phone, a dual-mode cellular/WiFi phone, a combination cellular/VoIP/WiFi/WiMAX phone or any suitable combination thereof. Specific examples of a mobile device can include cellular devices such as GSM, TDMA, CDMA, IS-95 and iDEN phones and cellular/WiFi devices such as dual-mode GSM, TDMA, IS-95 or iDEN/VoIP phones, UMTS phones UMTS VoIP phones, or like devices or combinations thereof. In support of mobile devices a gateway routing component of such a system can include any suitable component that can perform centralized routing within a mobile, satellite, or similar network (but optionally does not include components that route strictly within a PSTN network), routing between communication networks, between networks of varying architecture (e.g., between PSTN, GSM, UMTS, Enterprise VoIP, the Internet, or combinations thereof), or the like. Specific examples of a gateway routing component can include a GMSC, a gateway GPRS support node (GGSN), a session border control (SBC) device, or like devices. Additionally, a data storage component of such a system can include any suitable device, process, combination device and process, etc., that can store digital and/or switched information (e.g., server, database, data store, or the like).

FIG. 1 depicts an exemplary system 100 that facilitates conversation message routing for messaging environments in accord with aspects of the claimed subject matter. System 100 can include mobile device component 105. Mobile device component 105 can further include messaging input component(s) 110. Messaging input component(s) 110 can facilitate providing content and instructions for messaging in a messaging environment that can be native to the mobile device component 105. For example, messaging input component(s) 110 can include, but is not limited to, a keypad, camera, microphone, scroll wheel, slider, touch screen, button, switch, data source, memory store, user history, text converter, or combinations thereof. Messaging input component (s) 110 can be bound tightly to mobile device component 105 or can be loosely bound. For instance, messaging input component 110 can be a tightly bound camera and camera driver package of the mobile device 105. In another instance, messaging input component 110 can be a loosely bound Bluetooth™-type headset and voice command driver package associated (e.g., Bluetooth™ linked) to mobile device 105. The voice command driver package of the example can communicate information in a native format with the messaging environment of the mobile device 105.

System 100 can further include conversation message routing component (CMRC) 120. CMRC 120 can support one or more conversation topologies or classes. These classes can include 1:1, 1:M, and/or N:M conversations. For example, a 1:1 conversation includes messaging between two conversant entities (an exemplary topology for a 1:1 conversation is illustrated at 500 of FIG. 5); a 1:M conversation includes messaging of a first conversant entity communicating exclusively to a group of other conversants (an exemplary topology for a 1:M conversation is illustrated at 508 of FIG. 5); a N:M conversation includes messaging among a plurality of conversant entities (an exemplary topology for a N:M conversation is illustrated at 518 of FIG. 5). Further, a typical 1:M conversation includes messages from the first conversant to all members of the target group of conversants (1→M) and messages from any of the target conversants are communicated only to the first user (M→1) (e.g., target conversants are invisible to other target conversants but not to the first conversant.) This generally represents a broadcast message or blast messaging set which can be threaded or not threaded. Moreover, N:M conversations generally include a plurality of conversants that are all visible to each other. This generally represents a group messaging set which can be threaded or not threaded.

System 100 can further include one:one (1:1) component 130, one:many (1:M) component 140 and/or many:many (N:M) component 150 to facilitate communication in a messaging environment of the respective class or topography. Components 130-150 each can support a messaging communications protocol adapted to accommodate the respective communications topologies. As such and in accord with an aspect of the claimed subject matter, a messaging environment or threaded messaging environment system employing conversation message routing can support 1:1 conversations (employing component 130), 1:M conversations (employing component 140), and/or N:M conversations (employing component 150). System 100 can further route conversation/messaging information through messaging output component(s) 160 which can be communicatively coupled to CMRC 120 and access information of components 130-150.

Messaging output component(s) 160 can facilitate communicating messaging content and other aspects of the messaging environment (e.g., aspects of the messaging user interface, etc.) out of system 100. For example, messaging output component(s) 160 can include, but is not limited to, a display, speaker, touch screen interface, data source, memory store, user history, text converter, or combinations thereof. Messaging output component(s) 160 can be bound tightly or loosely to mobile device component 105 similar to messaging input component(s) 110 as disclosed herein. For example, messaging output component 160 can be a tightly bound display of the mobile device 105. In another example, messaging output component 110 can be a loosely bound WiFi connected external microdrive storage component linked to mobile device 105 to facilitate storing media files communicated over a messaging environment.

In accordance with another aspect of the disclosed subject matter, conversation message routing supports dynamic transitions between 1:1, N;M, and/or 1:M conversations. Components 130-150 can be communicatively coupled so as to facilitate transitioning between communications topologies dynamically as enabled by CMRC 120. For example, a conversant, C1, can be in a 1:1 conversation with conversant C2 and can add an additional conversant, C3. Conversant C3 can be added in the 1:M topology or in the N:M topology. Where the additional conversant, C3, is added in the 1:M class, the messages of C2 and C3 will only be visible to C1 (and the sending conversant) while the messages of C1 will be visible to both C2 and C3 (e.g., C2 and C3 are invisible to each other in the 1:M class). In contrast where C3 is added in the N:M class, messages from C1, C2 and C3 will be visible to C1, C2 and C3 and can be considered "group chats". The transition between a 1:1 class and either the 1:M or N:M class can be dynamic (e.g., the class change occurs is response to C3 being added by C1). In contrast to more conventional systems, the conversation environment can support this dynamic change, for example, in a threaded message environment, the new conversant's messages fall in line with the original conversants' messages despite the transition between classes.

This dynamic feature can be further illustrated by way of other non-limiting examples. For instance, where a predetermined limit for group messaging is set at five (5) conversants and a conversation begins as a 1:1 class, the conversation can dynamically adapt to a N:M conversation as up to four (4) more conversants are added (total of 5 conversants), similar to the prior example. However, as an additional conversant is added (e.g., a $6^{th}$ conversant, C6), system 100 can again dynamically adapt and can add an additional class to support mass messaging (e.g., 1:M class) for just the added conversants (e.g., the first 5 conversants remain in a group conversation (N:M) and additional conversant (C6) is added in a mass messaging conversation layer (1:M)). Alternatively, the dynamic adjustment can convert all (or any portion of) the first 5 conversants and the additional conversant (C6) into a pure mass messaging environment (all conversants (or a select subgroup thereof) are in a 1:M class). Again, these dynamic class transitions can be seamless such that a messaging environment for any one conversant reflects the messages from the perspective of the one conversant of the participating classes of conversants.

In this particular example, it is clearly advantageous that the conversants do not first have to close the messaging environment for the 1:1 conversation to open a group conversation environment as a separate action to support the group conversation of the first 5 conversants. Further, this benefit is again realized by not having to close the group conversation environment to open a new mass messaging environment to support more than 5 conversants. Moreover, where the conversants add C6 in a mass messaging class layer while maintaining the group conversation layer for the first 5 conversants, this can facilitate unique conversation topologies not currently exploited in the messaging industry. It is noteworthy, that additional conversants can be added to different conversation classes associated with a particular conversation dynamically without first reaching a predetermined limit.

In an additional example, dynamic class adjustments can be effected as conversants exit a particular conversation. For example, supposing a mass messaging (1:M) conversation of 1:15 conversants is occurring, the conversants can dynamically adjust this to a group conversation (5:5) as 11 conversants leave. Similarly where a total of 14 conversants have departed, the conversation can enter a 1:1 class.

Moreover, for example, conversants can dynamically break a larger conversation into smaller conversations or merge a plurality of smaller conversations. As such, the exemplary conversation of 1:15 (e.g., mass messaging class) can be broken into the following smaller exemplary conversations: four each 4:4 (four sets of 4 conversant group conversations), eight each 1:1 conversations (eight sets of 2 conversant conversations), one each 1:1 conversation and one each 4:4 conversation and one each 1:9 conversation, etc. Merging can execute the examples in the reverse action order. As is clear from just these examples, a nearly limitless number of combinations can be demonstrated for dynamic adjustment of conversations as conversants enter or depart from particular conversations. All of these examples are considered within the scope of the subject disclosure.

In a further aspect, support of and/or transition between 1:1, N;M, and/or 1:M conversations is enabled for legacy devices, between legacy devices and enabled devices, or between enabled devices only employing conversation message routing. Where messaging consumers will continue to employ legacy devices that do not include support components for conversation message routing supporting dynamic transitions, the subject disclosure contemplates facilitating dynamically transitioned communications with such legacy devices and systems. Support for these devices can be included within CMRC 120 or can be externally supported. For example, each enabled system can have one or more CMRC that adapt message content and routing in response to messages being accessed by legacy devices. This can be facilitated, for example, by including flags, hashes, signals, etc., into communications that are transparent to legacy devices but are active for enabled devices to allow discovery of legacy device and adaptation of messaging to support them in dynamic transitions. Similarly, an external component, for example at a nodeB or some other point in the messaging infrastructure, can serve in a similar capacity to the CMRC 120 of an enabled device to provide legacy device support. In an example, where a conversant has a legacy device a "dynamic transition" flag can be absent notifying the enabled devices that a legacy device is in the conversation. Messages for the exemplary conversation can be tagged with promotion information, be demoted to a legacy level and communicated. These demoted messages can be access by the legacy device in a transparent manner. Similarly, enabled devices can receive the demoted messages and access the promotion information to promote the messages such that they function as disclosed for the enabled devices of the conversation (e.g., reconstituting a demoted message). One of skill in the art will appreciate that this is but one limited example of many possible techniques for supporting legacy devices and will further appreciate that all support techniques for legacy devices are within the scope of the present disclosure.

Figure 2:
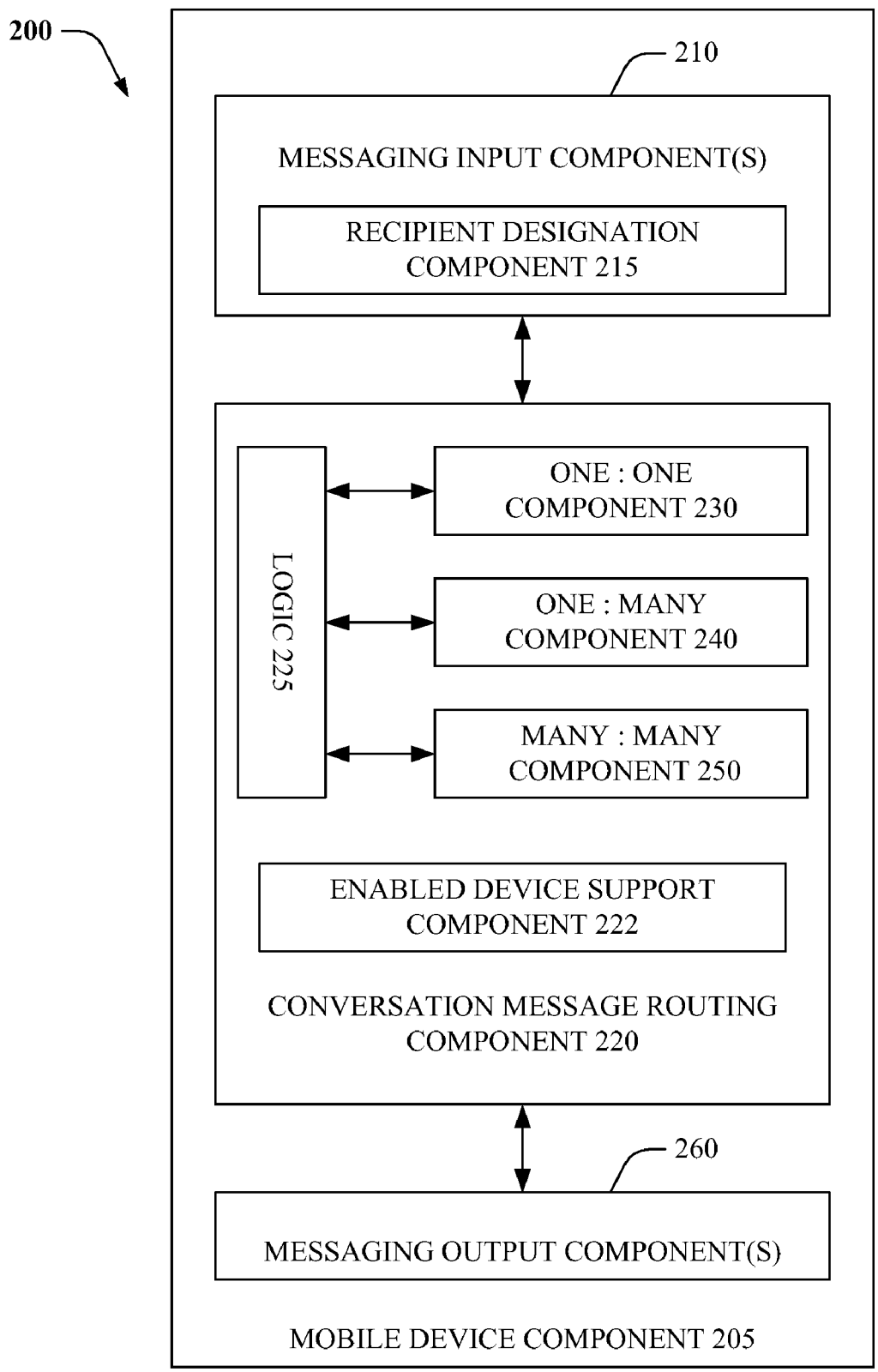
FIG. 2 depicts an exemplary system that facilitates conversation message routing for messaging environments in accord with aspects of the claimed subject matter.

FIG. 2 depicts an exemplary system 200 that facilitates conversation message routing for messaging environments in accord with aspects of the claimed subject matter. System 200 can include mobile device component 205 which can be the same as, or similar to mobile device component 105 of FIG. 1. System 200 can further include messaging input component(s) 210 which can further include recipient designation component 215. Messaging input component 210 can be the same as, or similar to messaging input component 110. Recipient designation component 215 can process indications of intended messaging recipients. These indications can be accessed by CMRC 220, which can be the same as, or similar to CMRC 120. An indication of recipient designation component 215 can relate, for example, the number of intended messaging recipients, the class or topology of the messaging environment for the messaging recipients, messaging device information related to the topology of the messaging environment, etc. This information can at least in part be employed by the CMRC 220 in facilitating dynamic transitioning as herein disclosed.

The CMRC 220 of system 200 can further include enabled device support component 222. Enabled device support component 222 can facilitate processing of communications messages from conversation message routing enabled devices. For example, messages sent form an enabled device can include flags to indicate that the message is from an enabled device such that enabled device support component 222 can process said flags to provide additional information about the messaging within CMRC 220, at least in part, enabling dynamic transitioning between conversation classes. As another example, enabled device support component 222 can process messages that have been degraded due to the presence of legacy devices in the communication environment, wherein the degraded message can include upgrade information that can be processed to reconstitute the message. One of skill in the art will appreciate that numerous other message related processing can be facilitated in relation to enabled device support and dynamic transitioning between classes, and moreover, that all such examples are considered within the scope of the current disclosure.

CMRC 220 can include a logic component 225. Logic component 225 can contain specific processing logic to facilitate selection of messaging classes based, for example, on conversant quanta. For instance, where X represents a variable related to the number of recipients of a communicated message, where X=1, the 1:1 component 230 can be selected for messaging. Where X increases to 15, CMRC 220 can dynamically transition the messaging class to 1:M component 250 based at least in part on processing information by way of logic component 225 further based in part on information related to enabled devices from enabled device support component 222. Similar to CMRC 120, CMRC 220 can include components to support 1:1 conversations (component 230), 1:M conversations (component 240), and/or N:M conversations (component 250). These components can respectively be the same as, or similar to, components 130, 140, and 150. A messaging output component(s) 260, the same as, or similar to 160, can further be included in system 200.

Figure 3:
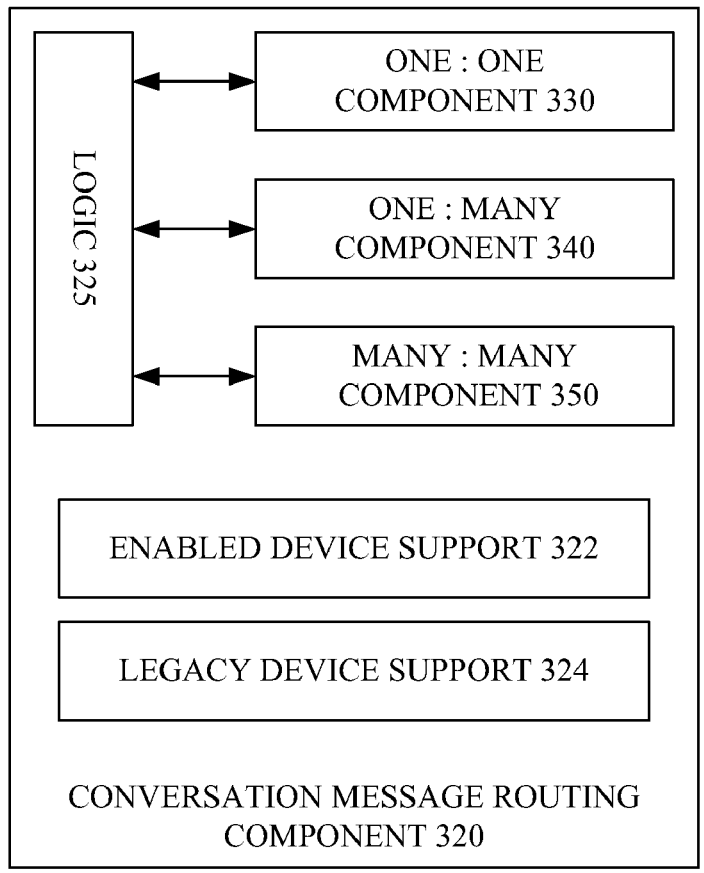
FIG. 3 illustrates an exemplary system that facilitates conversation message routing for messaging environments including legacy elements in accord with aspects of the claimed subject matter.

FIG. 3 illustrates an exemplary system 300 that facilitates conversation message routing for messaging environments including legacy elements in accord with aspects of the claimed subject matter. System 300 can include a CMRC 320 that can be the same as CMRC 120 or 220 as disclosed herein. CMRC 320 can further include a legacy device support component 324 in addition to the enabled device support component 322 which can be the same as or similar to enabled device support component 222.

Legacy device support component 324 can process information related to messaging with legacy devices. In an aspect information related to legacy devices can include the messages themselves with or without envelope information and the like. In an example, where a message is received from a legacy device, the envelope information wrapping the message, as will be appreciated by one of skill in the art to include information such as header information, can be missing information that would otherwise be expected in a message from an enabled device. This absence of information can be, for example, processed directly or used as a trigger to process the message body itself such that additional information can be gleaned to properly support the message from a legacy device. One of skill in the art will most certainly appreciate that many data analysis permutations can be employed in identifying legacy content and facilitate processing of such information on non-legacy systems and devices; all such permutations are considered directly within the scope of the disclosed subject matter.

Also similar to CMRC 220, CMRC 320 can include logic component 325 and components to support 1:1 conversations (component 330), 1:M conversations (component 340), and/or N:M conversations (component 350). These components can respectively be the same as, or similar to, components 225, 230, 240, and 250.

Figure 4:
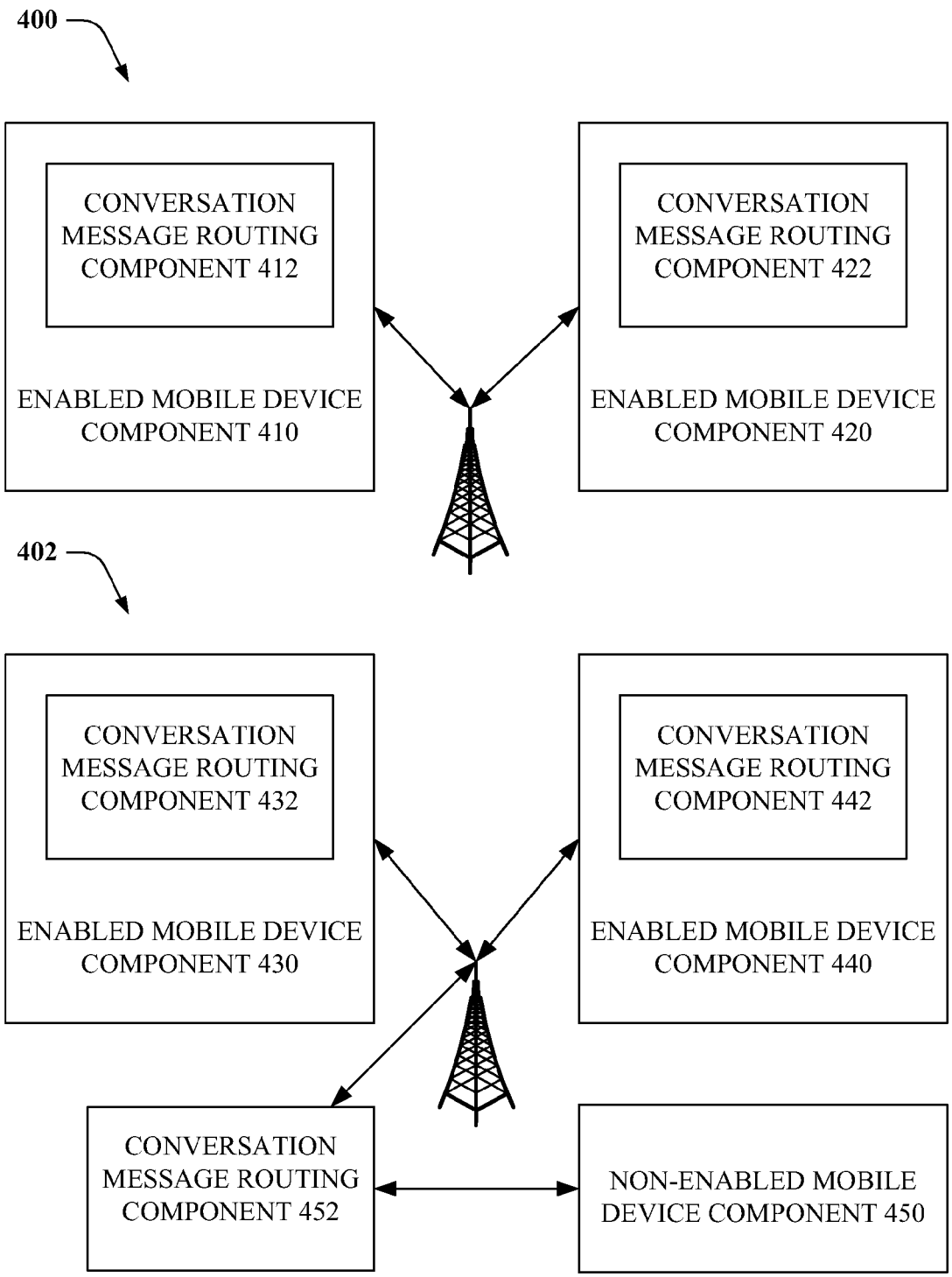
FIG. 4 illustrates exemplary systems that facilitates conversation message routing for non-legacy messaging environments or legacy messaging environments in accord with aspects of the claimed subject matter.

FIG. 4 depicts exemplary systems 400 and 402 that each facilitate conversation message routing for messaging environments in accord with aspects of the claimed subject matter. System 400 depicts an exemplary system related to non-legacy messaging devices. System 400 can include enabled mobile device component 410 which can further include CMRC 412.

Enabled mobile device component 410 can represent a first conversant device participating in a messaging environment. System 400 can further include at least a second such enabled mobile device component 420 which can further include CMRC 422. CMRC 412 and 422 can be the same, or similar, to CMRC 120, 220, or 320. Enabled mobile device component 410 can communicate with enabled mobile device component 420 across a network as depicted.

The communication across the network can include messaging. This messaging between enabled devices (410 and 420) each having CMRCs (412 and 422) can employ dynamic transition between messaging classes, for example, based on conversant quanta (e.g., changing numbers of conversants) or messaging topology (e.g., switching between 1:1, 1:M, and/or N:M). Thus, for example, as additional enabled mobile device components (not illustrated) are added across the communication network and join a messaging environment, the messaging environment can facilitate dynamic transitions among the various supporting protocols and messaging topologies in a seamless manner.

Similar to system 400, system 402 depicts support of enabled devices on a communications system. Enabled mobile device components 430 and 440 can be the same as, or similar to, enabled mobile device components 410 and 420. Further, enabled mobile device components 430 and 440 can respectively include CMRC 432 and 442. In addition to the support of enabled devices, system 402 further illustrates support for legacy devices. Non-enabled mobile device component 450 can represent a legacy device. In this exemplary embodiment, non-enabled mobile device component 450 does not include a CMRC. However, the functionality of a CMRC can, as disclosed herein, be supported external to a mobile device. As such, CMRC 452 can be external to non-enabled mobile device component 450. For example, CMRC 452 can be located at nodeBs or at other communications network equipment.

Messaging communication with non-enabled mobile device component 450 can be by way of CMRC 452 to at least facilitate support of messaging classes and dynamic transitioning as herein disclosed. Further, as stated herein, CMRC 452 is not required to support the legacy device as the processing done at CMRC 452 can be executed at CMRC 432 and/or 442 among others in the messaging environment (not illustrated). However, where CMRC 452 can be temporarily assigned to one or more legacy devices, the legacy devices can appear to the remainder of the messaging devices to be enabled devices where they sit behind the CMRC 452. One of skill in the art will appreciate that other network organizations can result in similar leveraging of additional "aftermarket" processing power to improve legacy device support on a communications network and further that all such network permutations are within the scope of the present disclosure.

Figure 5:
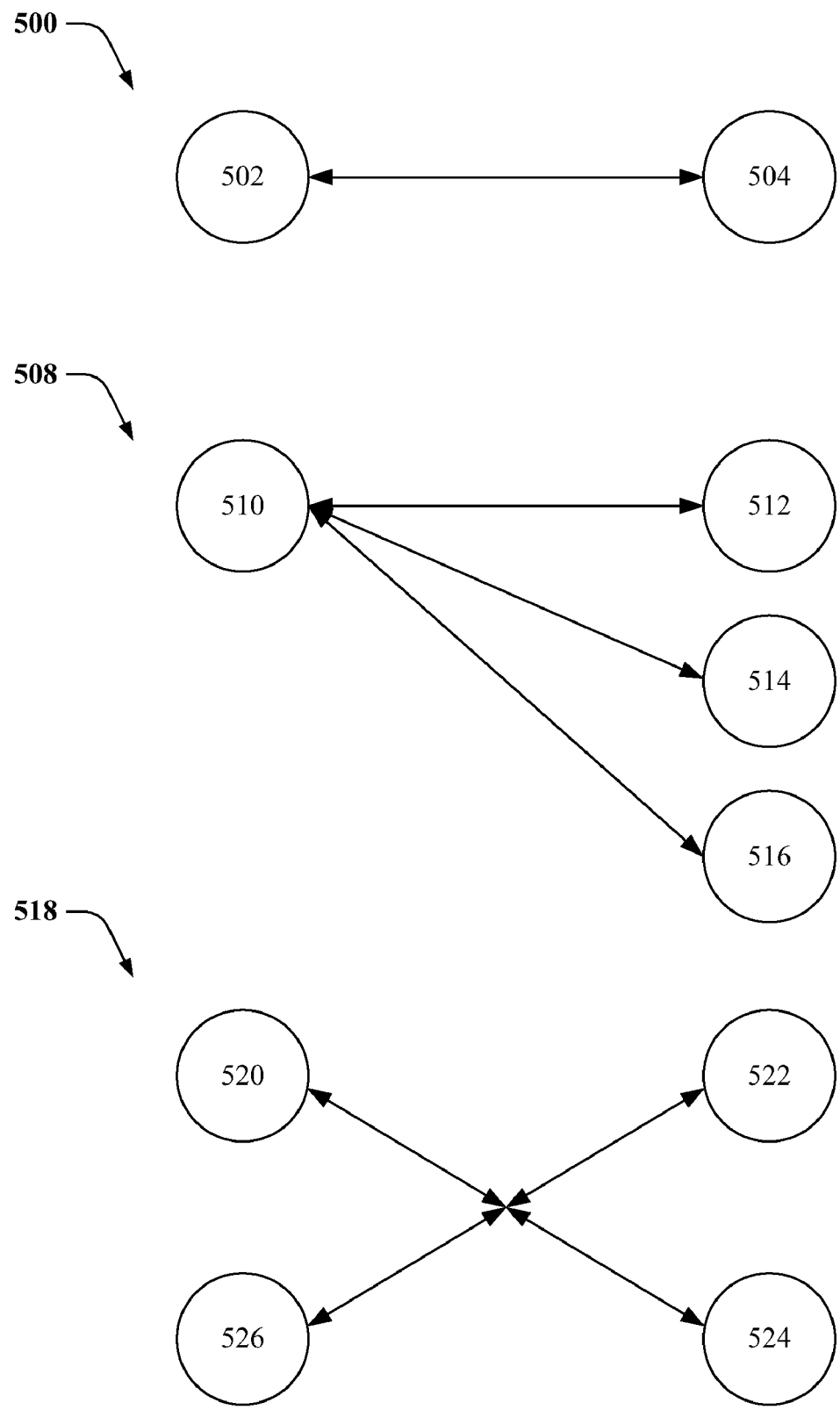
FIG. 5 depicts topologies of conversant classes in accord with aspects of the claimed subject matter.

FIG. 5 depicts topologies of conversant classes 500, 508, and 518 in accord with aspects of the claimed subject matter. System 500 illustrates a simple exemplary 1:1 class of messaging. In a 1:1 conversation, messaging occurs between two conversant entities, typically two users each with a messaging device. This generally represents person to person (threaded or not threaded). Where conversant 502 messages conversant 504 and conversant 504 can reply to conversant 502, this can be considered a 1:1 class.

System 508 is an exemplary 1:M conversation class. System 508 includes messaging between a conversant 510 and other conversant entities 512, 514, and 516 (generally at least two other conversant entities). Typically, in a 1:M conversation, messages from the conversant 510 will go to all members (512, 514, and 516) of the group of users (1→M) and messages from any of the members (512, 514, and 516) of the group will only be sent to the conversant 510 (M→1) (generally conversants 512, 514, and 516 are invisible to each other in a 1:M class.) This generally represents a broadcast message or blast messaging set which can be threaded or not threaded.

System 518 is an exemplary N:M conversation class. System 518 includes messaging among a plurality of conversant entities 520-526 (typically exceeding two conversants to distinguish N:M from 1:1 conversations). Generally, conversants 520-526 share messages with at least a subset of other users (typically the entire group, however subsets of less than the entire group are foreseen and are within the scope of the present disclosure.) This generally represents a group messaging (threaded or not threaded). For example, in a N:M conversation, messages from conversant 520 are accessible to all remaining members (522-526) of the group conversation (N→M) and messages from any of the other members of the group (520-526) will be sent all of the other members (520-526) of the group (M→N).

An N:M conversation class is typically associated with a threshold value, T, which represents the number of conversants allowed to participate in a group conversation. For example, where T=3, where there are three conversants (e.g., X=2) an N:M class messaging conversation can be allowed. As an additional conversant is added (e.g., X=3), the threshold is crossed and group conversations can be dynamically transitioned to a 1:M conversation class as disclosed herein. Similarly, when a conversant departs (e.g., X again=2) the threshold can again be crossed such that the conversation can be dynamically transitioned to an N:M conversation class. Of course, other indicators can be used to influence the dynamic transitions, for example reverting to a group conversation from a 1:M conversation can be by conversant selection rather than automatic transition. One of skill in the art will appreciate that numerous other conditions and logic can be applied to transitions between conversation classes in a dynamic manner and that all such aspects are well within the scope of the present disclosure.

Figure 6:
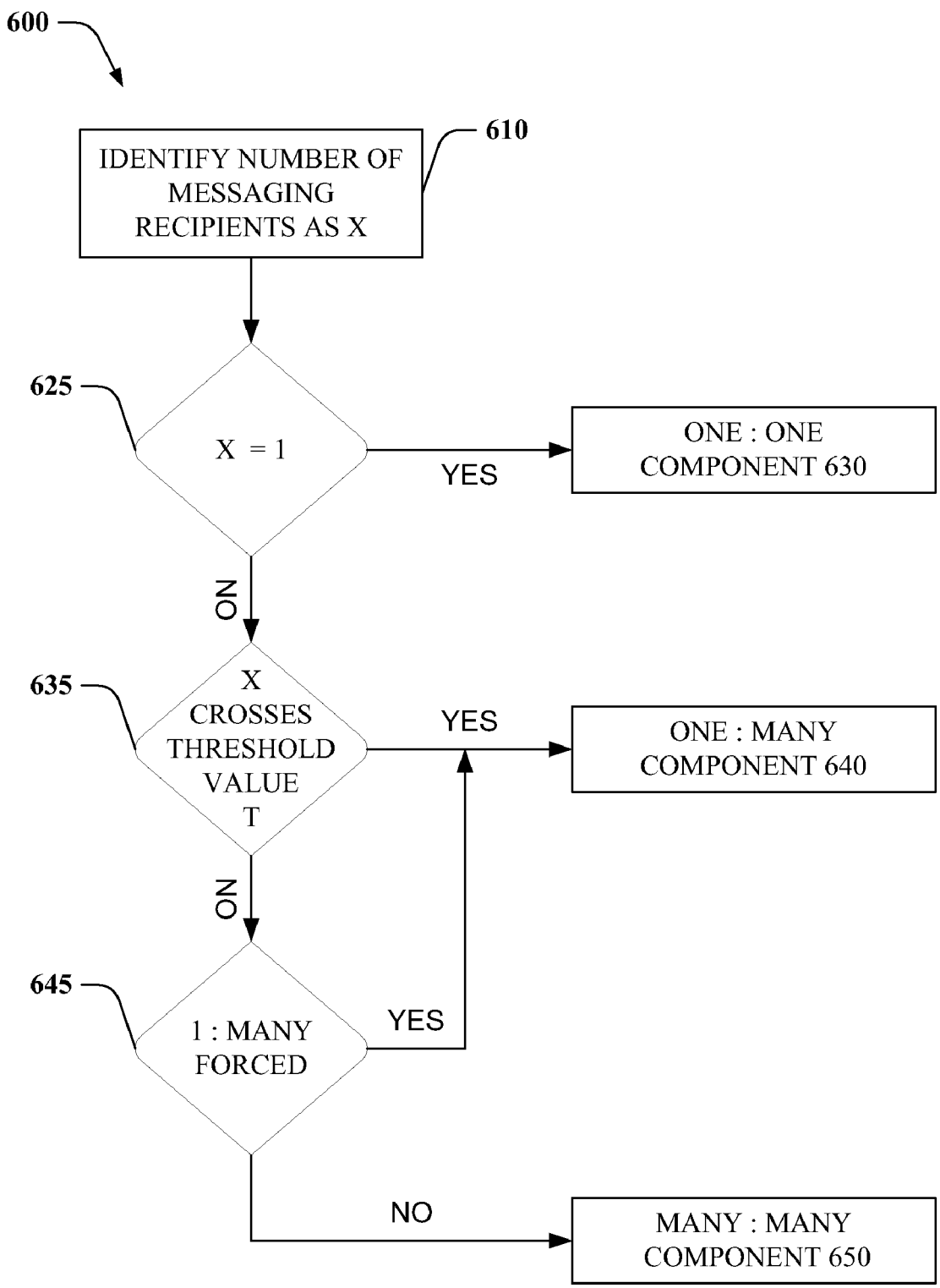
FIG. 6 depicts an exemplary flowchart facilitating conversation message routing for messaging environments in accord with aspects of the claimed subject matter.
Figure 7:
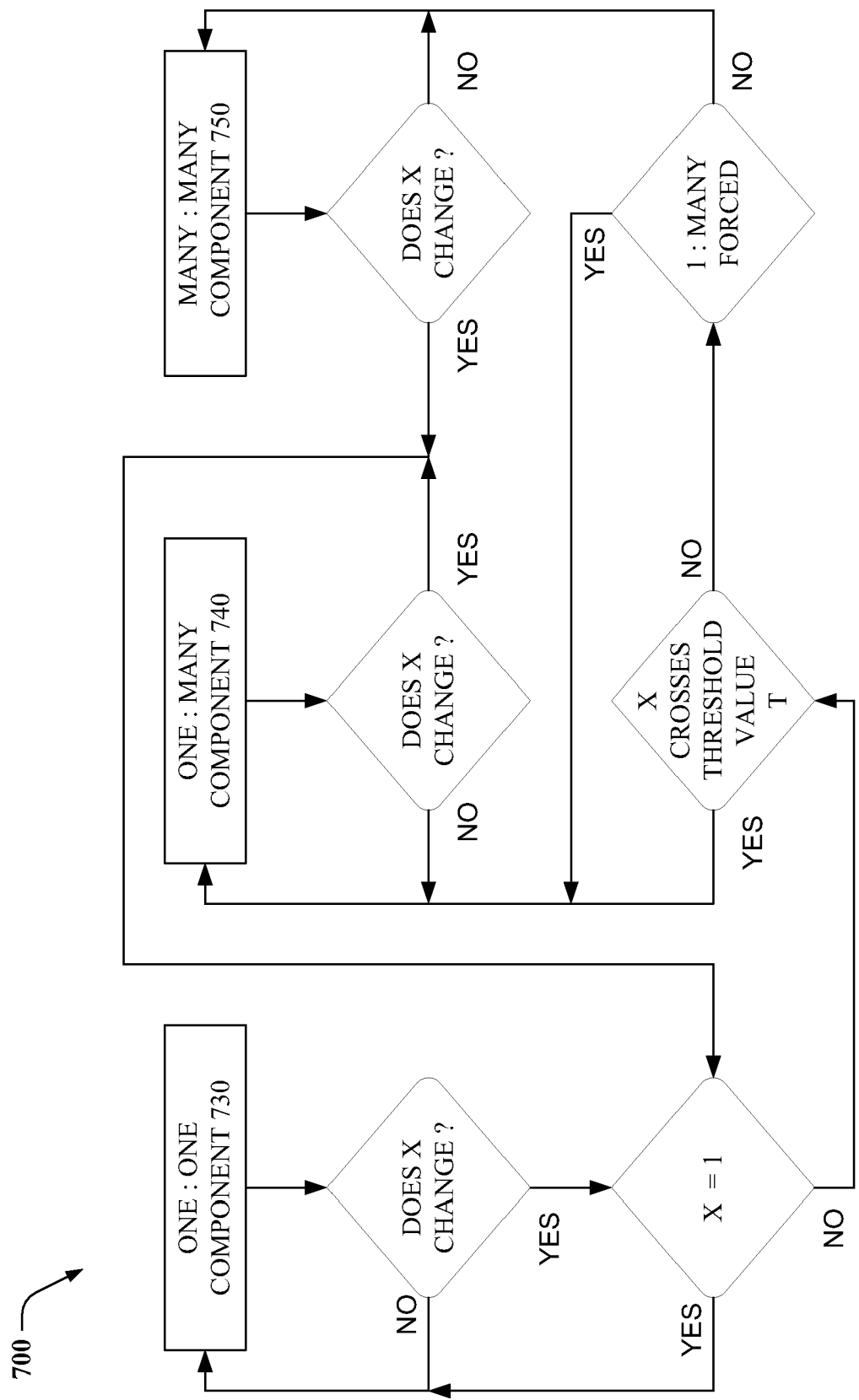
FIG. 7 depicts an exemplary flowchart facilitating dynamic conversation message routing for messaging environments in accord with aspects of the claimed subject matter.
Figure 8:
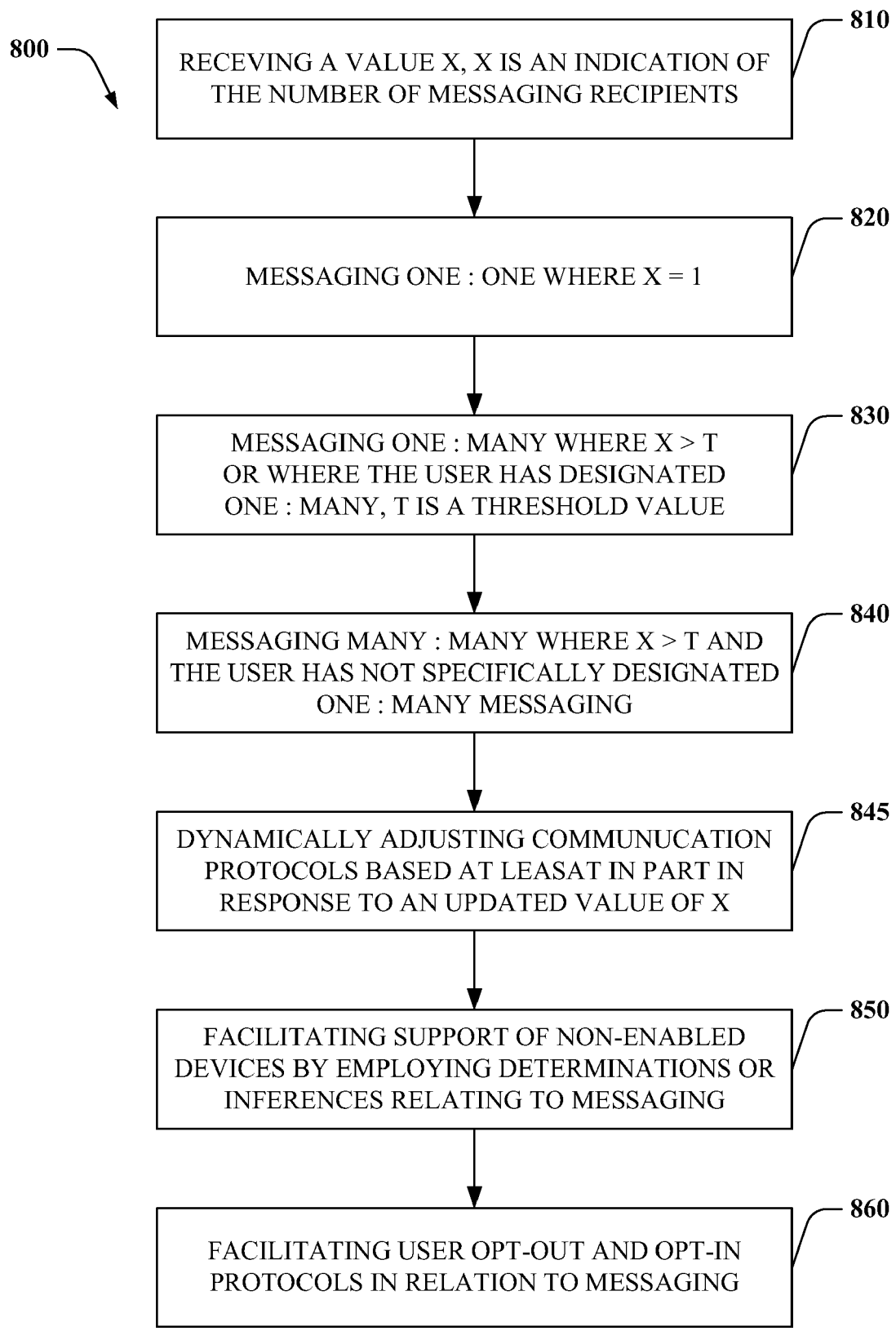
FIG. 8 illustrates an exemplary methodology for facilitating conversation message routing for messaging environments in accord with aspects of the claimed subject matter.

FIGS. 6, 7, and 8 depict exemplary flowcharts and methodologies in accord with the claimed subject matter. While, for purposes of simplicity of explanation, the methodologies are shown and described as a series of acts, it is to be understood and appreciated that the claimed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the claimed subject matter. Additionally, it should be further appreciated that the methodologies disclosed hereinafter and throughout this specification are capable of being stored on an article of manufacture or other computer readable storage medium to facilitate transporting and transferring such methodologies to computers.

FIG. 6 depicts an exemplary flowchart 600 facilitating conversation message routing for messaging environments in accord with aspects of the claimed subject matter. At 610, a number of messaging recipients can be identified and associated with a variable, for example X as disclosed herein. At 625, where X=1, a 1:1 conversation class is indicated and the messaging conversation can be enabled by way of component 630 which can be the same as, or similar to, component 130, 230, or 330.

At 635, if X crosses a threshold value, T, the conversation class can be determined to be a 1:M conversation class and can be facilitated by way of component 640. Component 640 can be the same as, or similar to, component 140, 240, or 340 as disclosed herein. Where X does not cross the threshold value, T, it can be determined at 645 if a conversant indicated that a 1:M conversation class is desired despite not crossing the threshold value, T. Where a conversant has indicated that a 1:M class is desired, the messaging can be facilitated by component 640. Where a conversant has not indicated that the 1:M class desired for the messaging environment, and X has not crossed the threshold value, an N:M conversation class can be indicated and can be facilitated by component 650. Component 650 can be the same as, or similar to, component 150, 250, or 350 as disclosed herein.

FIG. 7 depicts an exemplary flowchart 700 facilitating dynamic conversation message routing for messaging environments in accord with aspects of the claimed subject matter. From any component 730, 740, or 750, a change in the number of messaging recipients can be identified for a variable, for example X as disclosed herein. Where X has not changed, the conversation topology can remain unchanged. It is to be noted however that other considerations not illustrated in the exemplary flowchart 700 can be considered in dynamically transitioning between conversation topologies but are not disclosed to avoid an excessively complicated flowchart. One of skill in the art will appreciate that these permutations are within the scope of the disclosed subject matter. For example, a conversant can directly indicate a desired dynamic transition without any change in the number of conversants, for instance changing form group class to mass messaging class, and such dynamic transition can be facilitated within the scope of the subject disclosure.

Where a change in X is indicated, it can be first determined if X=1. Where X=1, a 1:1 conversation class is indicated and the messaging conversation can be enabled by way of component 730 which can be the same as, or similar to, component 130, 230, 330, or 630.

If X crosses a threshold value, T, the conversation class can be determined to be a 1:M conversation class and can be facilitated by way of component 740. Component 740 can be the same as, or similar to, component 140, 240, 340, or 640 as disclosed herein. Where X does not cross the threshold value, T, it can be determined if a 1:M conversation class is being forced despite not crossing the threshold value, T. Where a 1:M class is forced (e.g., 1:M desired by a conversant), the mass messaging can be facilitated by component 740. Where a 1:M class is not forced and X has not crossed the threshold value, an N:M conversation class can be indicated and can be facilitated by component 750. Component 750 can be the same as, or similar to, component 150, 250, 350, or 650 as disclosed herein. System 700 can be active throughout a messaging session to facilitate dynamic transitions between messaging conversation classes based in part on changes in the number of conversants.

FIG. 8 illustrates an exemplary methodology 800 for facilitating conversation message routing for messaging environments in accord with aspects of the claimed subject matter. At 810, methodology 800 can receive a value for a variable, X, wherein X indicates a number of messaging recipients in a messaging conversation environment. At 820, a 1:1 messaging class can be employed in the messaging environment where X is equal to 1 messaging recipient.

At 830, a 1:M messaging class can be employed in the messaging environment where X is crosses a threshold value, T, or an indication that 1:M messaging class is desired is present. The threshold value can be a predetermined value, for example 5, such that when there are more than 5 recipients a 1:M conversation class can be employed. This can reduce confusion associated with an excessive number of group conversants wherein everyone "hears" everyone else in the messaging environment.

At 840, an N:M conversation class can be employed in the messaging environment where X has not transitioned a threshold value. For example, a group message class can be employed where there is more than one messaging recipient but fewer than the threshold number and the user has not indicated that a mass messaging class is desired. However, one of skill in the art will appreciate that other factors can be incorporated into determinations related to selecting a conversation class and all such factors and forced selections are within the scope of the present disclosure even though not explicitly enumerated herein.

Further, it will be appreciated that inferences can be employed in selecting conversation classes. For example, a user history can be employed in an inferential analysis such that when a user selects certain conversants for a conversation, a specific conversation class is also selected. For example, where a user selects his wife and 4 children to message about what to have for dinner that night, even though this exceeds a threshold of T=3 (see a prior example) and a mass text would typically be selected, in this example an inference can be made that a group conversation will be more appropriate based, for example, on historical selection of group conversations for the family at about 6 pm midweek. The extensive use of inferences can have substantial impact on the dynamic transitioning and selection of conversation classes as will be apparent to one of ordinary skill in the art, and it will be further appreciated that all such use of inference is well within the scope of the disclosed subject matter.

At 845, the communication protocols (e.g., conversation classes) can be dynamically adjusted based at least in part in response to an updated value of X (e.g., as the number of conversants changes, the conversation class can dynamically adjust.) At 850, support of non-enabled legacy devices can be provided as disclosed herein. In an aspect, inference and/or determinations related to the messaging can be employed in facilitating said support of legacy devices, also as disclosed herein. For example, it can be inferred that a device if a legacy device where messaging is encoded in a particular format, triggering support for legacy devices employing that particular message encoding. Numerous other examples will be apparent to the skilled practitioner and all such examples are within the scope of the disclosed subject matter.

At 860, conversants can opt-in or opt-out of particular conversation classes disclosed herein. This can facilitate direct selection of desired conversation classes over and above the disclosed automatic selection of classes based in part on the number of conversants and determinations and inferences surrounding the messaging and the conversants. At this point methodology 800 can end.

Figure 9:
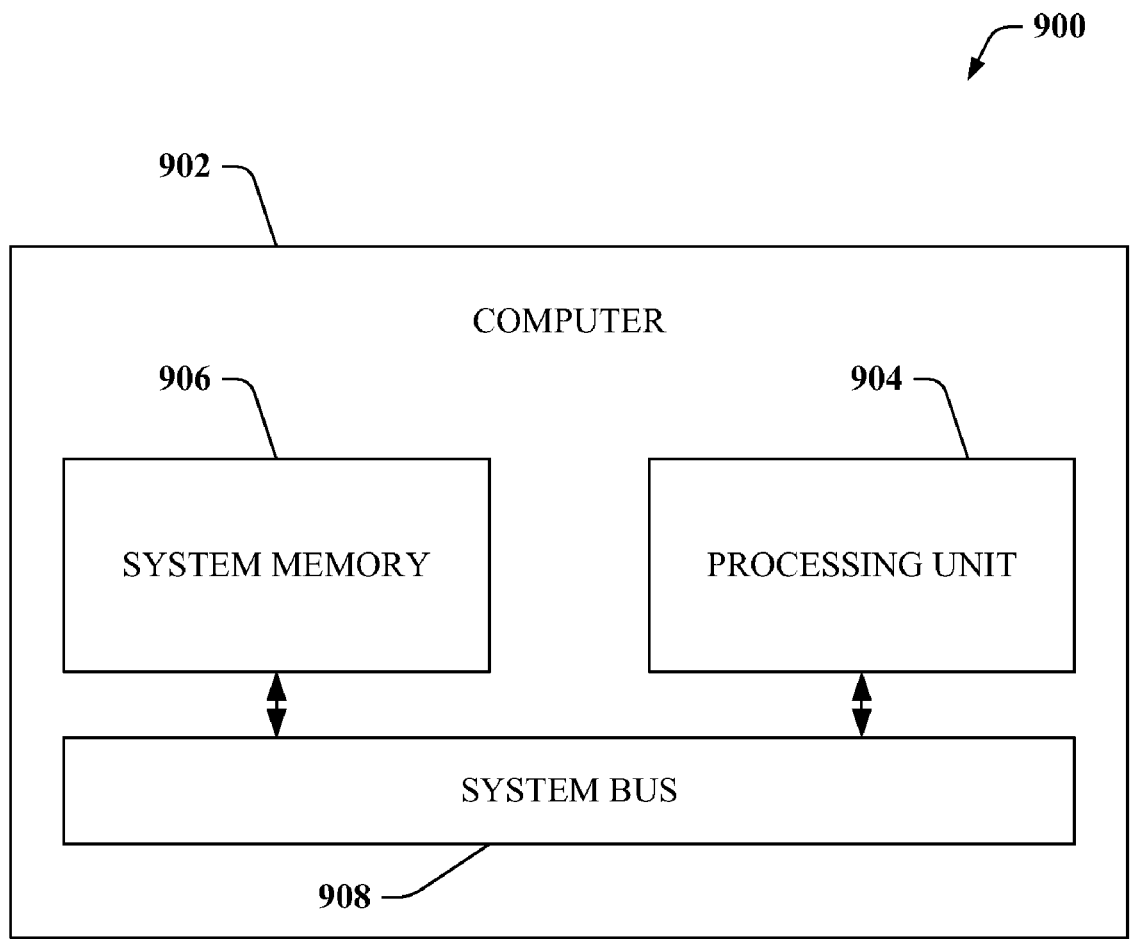
FIG. 9 illustrates a sample operating environment that can determine and store information related to a missed call in accord with aspects of the claimed subject matter.

In order to provide additional context for various aspects of the claimed subject matter, FIG. 9 and the following discussion are intended to provide a brief, general description of a suitable computing environment 900 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors, such a single core processor, a multi-core processor, or any other suitable arrangement of processors. The system bus 908 can be any of several types of bus structure that can further interconnect to a memory bus (with or without a memory controller), a peripheral bus, and a local bus using any of a variety of commercially available bus architectures. The system memory 906 can include read-only memory (ROM), random access memory (RAM), high-speed RAM (such as static RAM), EPROM, EEPROM, and/or the like. Additionally or alternatively, the computer 902 can include a hard disk drive, upon which program instructions, data, and the like can be retained. Moreover, removable data storage can be associated with the computer 902. Hard disk drives, removable media, computer-readable storage media, etc. can be communicatively coupled to the processing unit 904 by way of the system bus 908.

The system memory 906 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 902 through one or more wired/wireless input devices, such as a keyboard, pointing and clicking mechanism, pressure sensitive screen, microphone, joystick, stylus pen, etc. A monitor or other type of interface can also be connected to the system bus 908.

The computer 902 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 902 can connect to other devices/networks by way of antenna, port, network interface adaptor, wireless access point, modem, and/or the like.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 10:
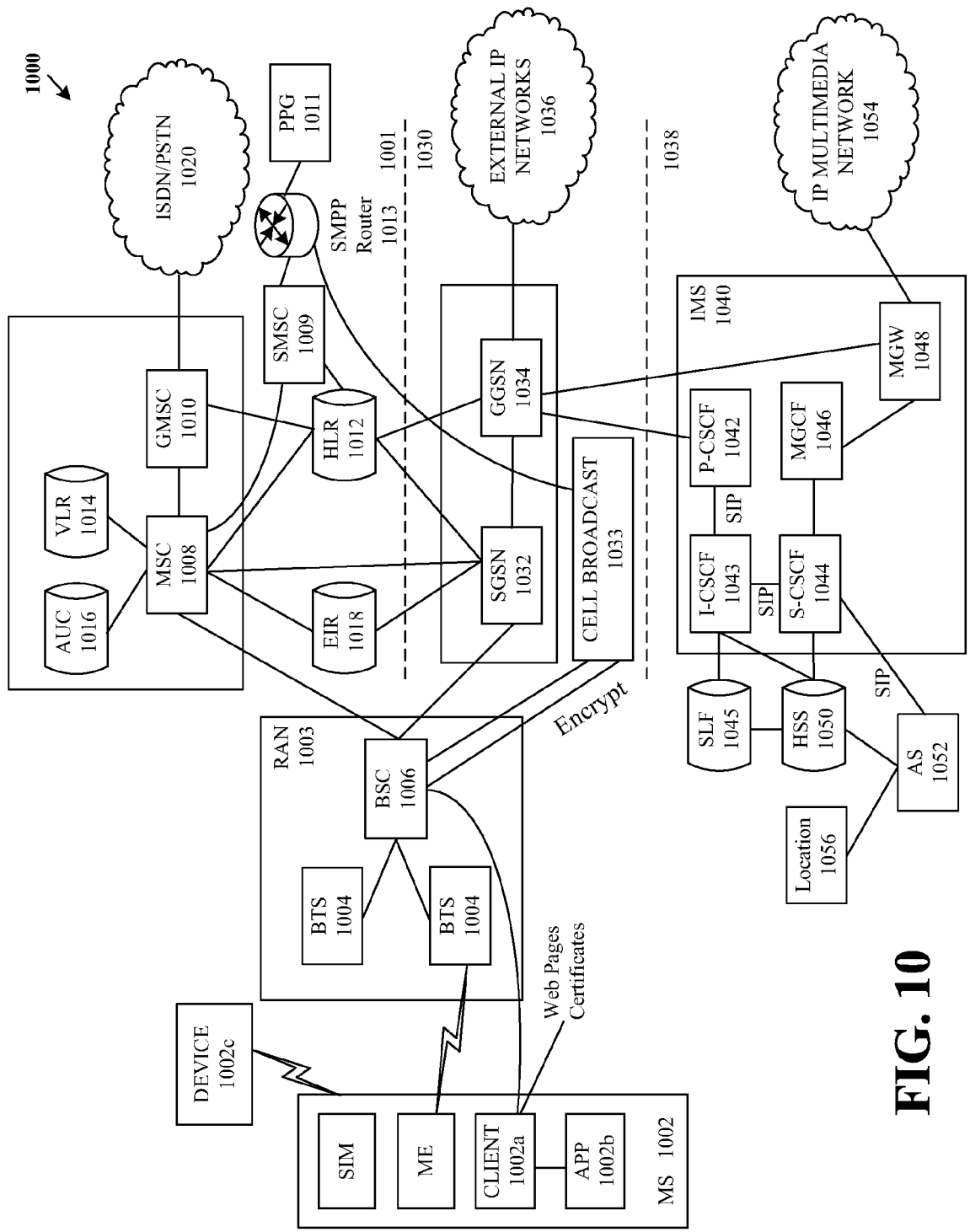
FIG. 10 depicts a sample network-environment for effectuating mobile communication in accord with aspects of the subject innovation.

Now turning to FIG. 10, such figure depicts a GSM/GPRS/IP multimedia network architecture 1000 that includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1002 includes an embedded client 1002*a* that receives and processes messages received by the MS 1002. The embedded client 1002*a* can be implemented in JAVA and is discuss more fully below.

The embedded client 1002*a* communicates with an application 1002*b* that provides services and/or information to an end user. One example of the application can be navigation software that provides near real-time traffic information that is received via the embedded client 1002*a* to the end user. The navigation software can provide road conditions, suggest alternate routes, etc. based on the location of the MS 1002. Those of ordinary skill in the art understand that there are many different methods and systems of locating an MS 1002.

Alternatively, the MS 1002 and a device 1002*c* can be enabled to communicate via a short-range wireless communication link, such as Bluetooth™. For example, a Bluetooth™ SIM Access Profile can be provided in an automobile (e.g., device 1002*c*) that communicates with the SIM in the MS 1002 to enable the automobile's communications system to pull information from the MS 1002. The Bluetooth™ communication system in the vehicle becomes an "embedded phone" that employs an antenna associated with the automobile. The result is improved reception of calls made in the vehicle. As one of ordinary skill in the art would recognize, an automobile is one example of the device 1002*c*. There can be an endless number of devices 1002*c* that use the SIM within the MS 1002 to provide services, information, data, audio, video, etc. to end users.

The BTS 1004 is physical equipment, such as a radio tower, that enables a radio interface to communicate with the MS. Each BTS can serve more than one MS. The BSC 1006 manages radio resources, including the BTS. The BSC can be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 can be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 can also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates selection of and dynamic transitioning among messaging conversation classes for mobile computing devices, comprising:
    a messaging input component that provides access to information relating to a message for a messaging conversation environment;
    a conversation message routing component that can at least in part facilitate selecting a conversation class, wherein a conversation class includes at least a protocol to facilitate messaging communication between at least a determinate plurality of conversants engaging in the messaging conversation environment; and
    a messaging output component at least in part facilitating conversant participation in a messaging conversation related to a selected conversation class executed in at least the messaging conversation environment,
    wherein dynamic transition between conversation classes is based at least in part on a change in the number of conversants of a messaging conversation environment, and wherein dynamic transition from a first conversation class to a second conversation class is based at least in part on the number of conversants transitioning a predetermined threshold value.

2. The system of claim 1, wherein the conversation class is a 1:1 messaging protocol, a 1:Many messaging protocol, or a Many:Many messaging protocol.

3. The system of claim 2, wherein a 1:1 messaging protocol facilitates a messaging conversation between a first conversant and a second conversant.

4. The system of claim 2, wherein a 1:Many messaging protocol facilitates a messaging conversation between a first conversant and a plurality of other conversants, wherein messages for the conversation from any of the plurality of other conversants are visible to the first conversant but not to any other member of the plurality of other conversants.

5. The system of claim 2, wherein a Many:Many messaging protocol facilitates a messaging conversation between a three or more conversants in which messages between conversants are visible at least a subset of the other conversants.

6. The system of claim 5, wherein the at least a subset of the other conversants is all of the conversants.

7. The system of claim 1, further comprising at least a legacy device support component to facilitate support of legacy devices across supported conversation classes of the messaging conversation environment.

8. The system of claim 7, wherein the legacy device support component determines the presence of a legacy device contributing to a messaging conversation environment based at least in part on the absence of indicia of an enabled messaging device in message information from the legacy device.

9. The system of claim 7, wherein the legacy device support component infers the presence of a legacy device contributing to a messaging conversation environment based at least in part on the absence of indicia of an enabled messaging device in message information from the legacy device.

10. The system of claim 7, wherein the legacy device support component can be local to at least one enabled device participating in the messaging conversation environment.

11. The system of claim 7, wherein the legacy device support component can be separate from any enabled device participating in the messaging conversation environment.

12. A method that facilitates selection of and dynamic transitioning among messaging conversation classes for mobile computing devices, comprising:
   identifying a number of message recipients related to a message for a messaging conversation environment;
   determining if that number transitions a predetermined threshold number;
   utilizing a computer system to at least in part select a conversation class based at least in part on the identified number of messaging recipients and the determination relating to the threshold number, wherein a conversation class includes at least a protocol to facilitate messaging communication between at least a determinate plurality of conversants engaging in the messaging conversation environment;
   determining a change in the number of conversants of the messaging conversation environment; and
   based at least in part on any identified change, dynamically transitioning to an appropriate conversation class.

13. The method of claim 12, wherein an appropriate conversation class includes one of a 1:1 messaging protocol, a 1:Many messaging protocol, or a Many:Many messaging protocol.

14. The method of claim 12, dynamically transitioning from a first conversation class to a 1:Many conversation class when the number of conversants exceeds the threshold number.

15. The method of claim 12, dynamically transitioning form a first conversation class to a Many:Many conversation class when the number of conversants does not exceed the threshold number.

16. The method of claim 12, dynamically transitioning from a first conversation class to a 1:1 conversation class when the number of conversants is two (2).

17. A computer based system, embodied in a mobile device, that facilitates selection of and dynamic transitioning among messaging conversation classes related to group threaded messaging environments, comprising:
   a conversation message routing component including components for processing protocols related to a 1:1 messaging protocol, a 1:Many messaging protocol, and a Many:Many messaging protocol, wherein, based at least in part on an identified number of message recipients related to messaging conversation environment and a predetermined threshold number, a conversation class can be dynamically selected such that a 1:1 conversation class is selected when the number of conversants is two (2), a Many:Many conversation class is selected when the number of conversants does not exceed the threshold number, and a 1:Many conversation class is selected when the number of conversants exceeds the threshold number; and
   a legacy device support component to facilitate support of legacy devices participating in the messaging conversation environment, wherein the legacy device support component determines or infers the presence of a legacy device contributing to a messaging conversation environment based at least in part on the absence of indicia of an enabled messaging device in message information from the legacy device, the legacy device support component further supporting message degradation and message promotion in relation to supporting legacy devices and enabled devices participating in the messaging conversation environment.

* * * * *